April 5, 1955

E. L. MINNICH 2,705,760

CRYSTAL MOUNTING MEANS

Filed June 19, 1953

INVENTOR.
EDWARD L. MINNICH
BY
ATTORNEY

April 5, 1955  E. L. MINNICH  2,705,760
CRYSTAL MOUNTING MEANS
Filed June 19, 1953  3 Sheets-Sheet 2

INVENTOR.
EDWARD L. MINNICH
BY
ATTORNEY

April 5, 1955     E. L. MINNICH     2,705,760
CRYSTAL MOUNTING MEANS

Filed June 19, 1953     3 Sheets-Sheet 3

INVENTOR.
EDWARD L. MINNICH
BY
ATTORNEY

United States Patent Office 2,705,760
Patented Apr. 5, 1955

2,705,760

CRYSTAL MOUNTING MEANS

Edward L. Minnich, Carlisle, Pa., assignor to Reeves-Hoffman Corporation, Carlisle, Pa., a corporation of Pennsylvania Application June 19, 1953, Serial No. 362,753

14 Claims. (Cl. 310—9.4)

This invention relates to improvements in piezoelectric crystal mounting means and is concerned, more particularly, with mounting devices for protecting the crystal from mechanical vibrations and shocks such as encountered when used in mobile communications equipment and for preserving the frequency stability of the crystal during such vibrations and shocks. The principles of the invention are particularly applicable to AT cut crystals and other crystals which similarly oscillate in a thickness mode and which have adherent electrode coatings on their major surfaces. The principles of the invention are especially advantageous in connection with crystals oscillating or resonant at frequencies below 2 mc. and as frequencies are reduced to lower values from the 2 mc. point the advantages become increasingly apparent.

Crystal protection and frequency stability preservation have long been a problem in the art and the many efforts heretofore devised have provided inadequate solution particularly when confronted with the high standards required for military usage. A common practice heretofore has been to mount the crystal plates between supporting elements which clamp the crystal at opposing points on its edge surfaces. Generally only two such supports are employed as their clamping action tends to reduce the amplitude of oscillation and as the number of such supporting clamps is increased the damping action increases toward an intolerable degree. Such opposed point mounting clamps have proven unsatisfactory because they tend to impart a twisting force to the supported crystal causing the element to move slightly within the clamp and resulting in a change of its frequency and other electrical characteristics.

The present invention has for its primary object the provision of a mounting means designed specifically to eliminate the adverse effects of clamping and in general to provide protection for a supported crystal and preservation of its frequency stability under severe conditions of mechanical vibration and shock.

Another object is to provide a mounting means for supporting a crystal without clamping action but which if desired may permit movement of the crystal plate without, however, disturbing its electrical characteristics.

Another object is to provide a crystal mounting means as well as crystal devices embodying such mounting means which in addition to maintaining frequency stability and general protection of the crystal are relatively inexpensive in cost of manufacture and assembly and extremely durable and efficient in operation.

Other and further objects and advantages will be apparent from the following detailed description taken in conjunction with the accompanying drawings wherein preferred embodiments of the principles of the invention have been selected for exemplification.

Figure 13:
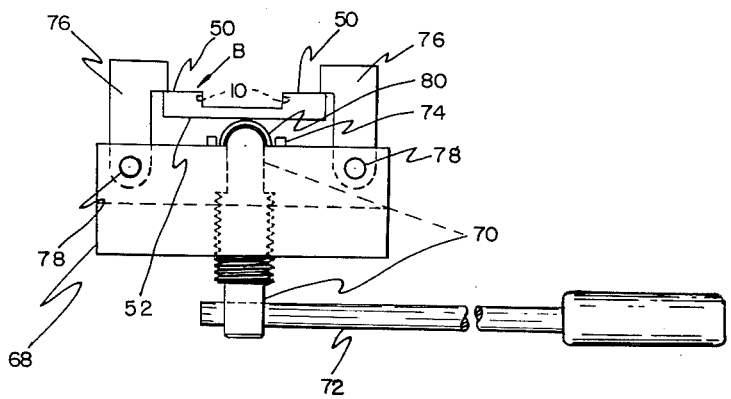
Figure 14:
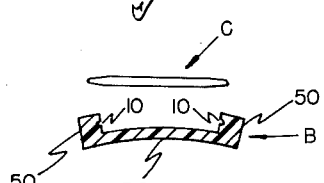
Figure 15:
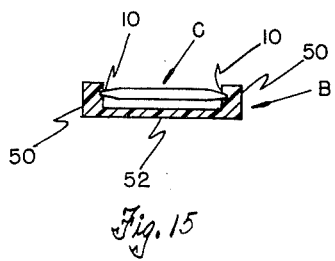

Fig. 13 is an elevational view of a tool adapted to distort the mounting blocks to receive the crystals and forming a part of the invention; and Figs. 14 and 15 are detail sectional views showing, respectively, a mounting block distorted or spread by the tool shown in Fig. 13 or by other means in position for insertion of a crystal and the same mounting block and crystal in normal operative assembly.

Figure 5:
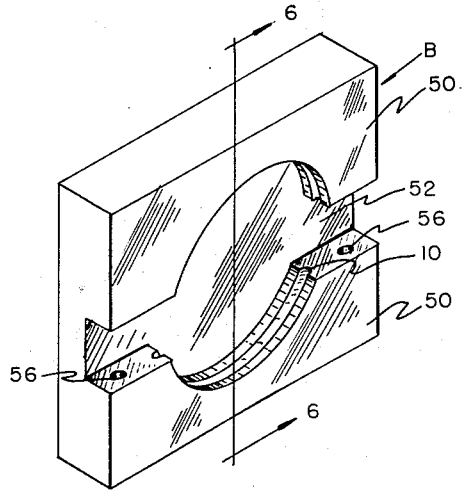
Fig. 5 is an enlarged front perspective view of a crystal mounting block as contemplated by the invention and of the character shown in Figs. 1–4.
Figure 6:
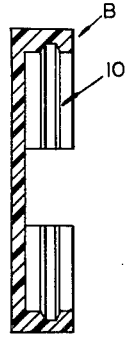
Fig. 6 is a vertical sectional view on the line 6—6 of Fig. 5.
Figure 7:
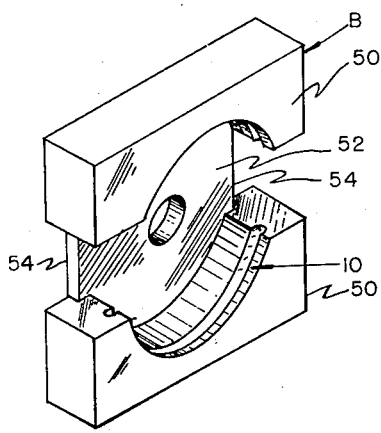
Fig. 7 is a view similar to Fig. 5 illustrating a mounting block of somewhat modified form.

Referring more particularly to the drawings, wherein like numerals refer to like parts, the present invention features, in its essential respects, the provision of a crystal element mounting block indicated generally at B which may take a variety of specific forms as will hereinafter appear. Such blocks B are formed preferably of non-conducting or electrical insulating material and have resilient characteristics such that the block may be spread or otherwise distorted to receive the quartz plate and returned to normal position to retain the seated plate in operative oscillating position. Synthetic resinous compositions, such as Teflon or nylon, are suitable types of material for the construction of the blocks B. Suitable forms for blocks B are illustrated in Figs. 5–7, which will hereinafter be further referred to, and, as shown therein, the blocks are provided with arcuate grooved portions indicated generally at 10 for receiving edge portions of the quartz crystal plate to be mounted. The blocks B are adapted for use in crystal devices of a variety of specific types of which those shown in Figs. 1–4 are illustrative.

Figure 1:
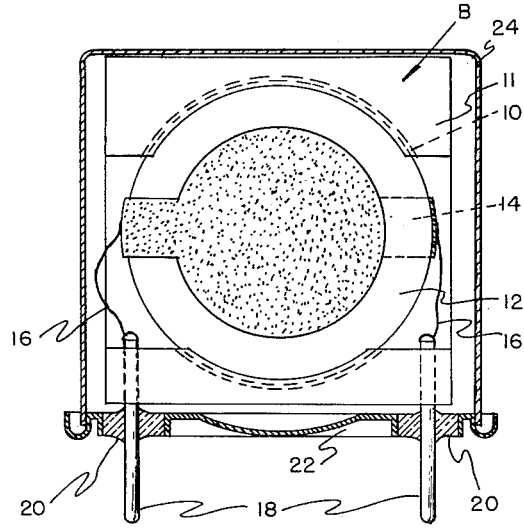
Fig. 1 is a front vertical sectional view of a quartz crystal holder constructed in accordance with the present invention.
Figure 2:
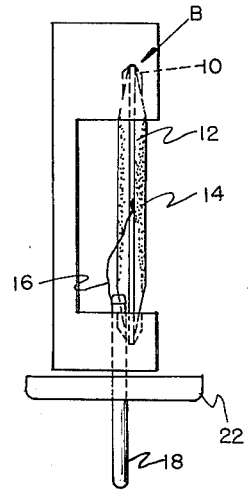
Fig. 2 is a side elevational view of the holder shown in Fig. 1 with the outer casing removed.

The crystal device shown in Figs. 1 and 2 includes a protective mounting block B of the present invention as shown at 11 but otherwise is substantially in accordance with a conventional type which employs a round quartz crystal element 12 having electrodes 14 plated upon the opposed major surfaces and overlying an adjacent edge. Lead wires 16 of small diameter and formed of a conducting material such as Phosphor bronze, copper or silver are soldered or otherwise attached to each electrode 14 and to the pins 18 which extend through a glass insulating material 20 in the header 22 and which serve as plugs for insertion in a conformingly designed socket. A cover 24 houses the crystal element and its connections, as shown.

Figure 3:
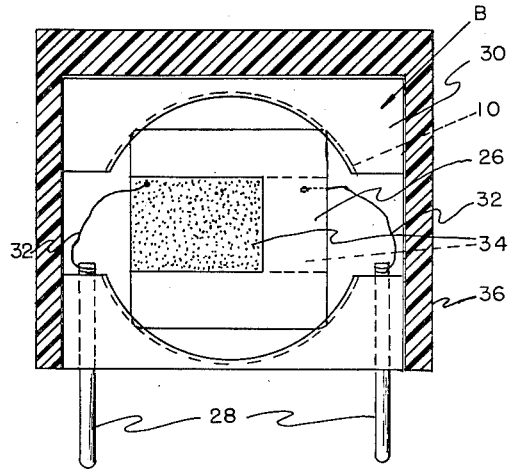
Fig. 3 is a front vertical sectional view of a modified form of crystal holder, in accordance with the invention.

The crystal device shown in Fig. 3 is illustrative of the application of the invention to a very simple low cost holder and also illustrates the use of the blocks B with rectangular or substantially square crystal plates such as shown at 26 seated in the arcuate groove portions 10. The connector plug pins 28 are force fitted or molded into the insulating block 30 and connected at their protruding ends by the lead wires 32 to the faces of electrodes 34. The cover 36 is of plastic material which may, if desired, be the same as the material of the block 30 which supports the crystal element 26 and the skirt portion of the cover 36 can be cemented to the lower portion of the blocks 30 to provide a unitary dust tight holder.

Figure 4:
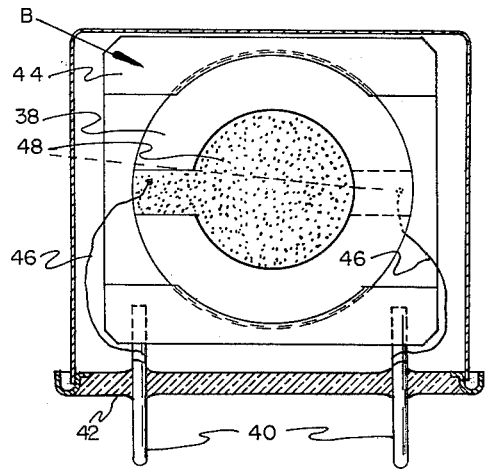
Fig. 4 is a front vertical sectional view of another modified form of crystal holder, in accordance with the invention.

The crystal device shown in Fig. 4 is somewhat similar to that of Figs. 1 and 2 and illustrates the manner in which a larger quartz plate 38 may be employed in the same type of assembly. Herein the connector plug pins 40 which extend through the glass header 42 have their inner extremities seated in the lower body portion of the block 44 and the lead wires 46 connect intermediate portions of the pins 40 to the electrodes 48, the electrode connections being to the major surface regions close to the edges of the plate 38.

It will be understood that the particular features of the crystal devices shown in Figs. 1–4 may be interchanged or modified as desired and that the principles of the invention are equally as applicable to many other specific types of crystal devices not herein illustrated, as will be readily apparent to those skilled in the art.

Blocks B of the same general character employed in the devices of Figs. 1–4 are shown in enlarged detail in Figs. 5–7. The shapes of these blocks which, as explained above, are preferably formed of non-conducting resilient material are not particularly critical provided opposed arcuate grooved portions 10 are present and capable of being spread apart to receive edge portions of the crystal plate element. In promotion of the spreading or bending operation, it is convenient to provide relatively thick and non-resilient end portions 50 having opposed inner arcuate faces carrying the grooved portions 10 and a relatively thinner and resilient back plate 52 integrally connecting the end portions and capable of permitting the end portions to be urged slightly apart and returned to normal position in a spring-like action. The backing 52 need not extend continuously across the block B as indicated by the set-in side walls 54 shown in Fig. 7. Bores 56 as shown in Fig. 5 may and preferably are formed in the lower end portion 50 and extended either partially or entirely therethrough to receive the connector plug pins which may, as in the assemblies shown in Figs. 1 and 4, provide a support for the block. Further, blocks B may be molded or otherwise formed in a single piece or composed of sections fused or adhered together.

The crystal plate supported in the block B preferably floats within the confines of the grooved portions 10. That is to say, the grooved area and the peripheral edge of the crystal may be relatively dimensioned so that the crystal plate may move slightly, say from three to five thousandths of an inch in any direction from mean or centered position. Such free mounting permits the crystal to oscillate or vibrate at high amplitudes of oscillation. In some instances, however, such as at the higher frequencies, it is desirable that the crystal plate be tightly held or squeezed in the supporting grooved portions and this may be effected by appropriately adjusting the relative dimensions of the grooved area and the peripheral edge of the crystal or by modifying the shape of the cross-sectional shape of the grooves or both. The length of the grooved area, for most purposes, does not appear to be particularly critical. Better results, however, have been obtained with some circular crystals by limiting the length of the grooved or recessed area to 60 to 80 degrees of total arc. The discontinuous grooved arc which permits free access to opposed side portions of the supported crystal, as apparent in all the illustrated modifications, is particularly advantageous in that the electrical connections to the plated electrodes may be made of fine wire which, unlike the heavy connector clamps heretofore used, exert only a very slight pressure upon the quartz plate. Such slight pressure or holding effect of the fine wire connections, however, is sufficient to prevent the plate from rotating since the concentric relationship of the supporting element and plate requires only a minimum retaining force.

Figure 8:
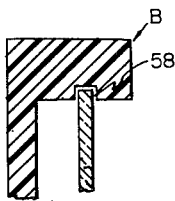
Figs. 8, 9, 10, 11 and 12 are fragmentary vertical sectional views on a relatively enlarged scale showing preferred forms of crystal supporting grooves provided in the mounting blocks for association with various types of crystal elements.
Figure 9:
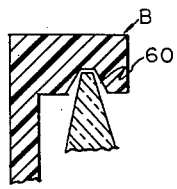
Figure 10:
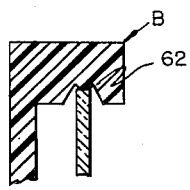
Figure 11:
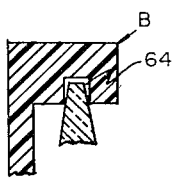
Figure 12:
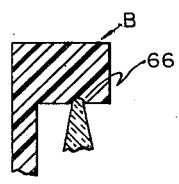

Figs. 8–12 are illustrative of some of the various groove shapes and crystal edge supporting arrangements contemplated by the invention. Fig. 8 shows a channel 58 for the floating or free mounting of a flat crystal plate and Fig. 9 shows a diverging sidewall groove 60 for similar mounting of a tapered edge crystal, the slight space between the crystal edge and the groove bottom wall permitting movement or floating of the crystal and there being no pressure upon the peripheral face portions of the crystal. Fig. 10 represents a modified form of groove 62 which can be used either for free mounting or squeeze or clamp mounting depending upon the relative diameters of groove and crystal and the recess shown at 66 in Fig. 12 is similar in this respect. The groove 64 in Fig. 11 has converging or right angled sidewalls intended to bear against peripheral face portions of a tapered edge crystal and is designed only for squeeze or clamp mounting.

For mounting or inserting a crystal element within the grooved supporting area of a block B a tool of the character shown in Fig. 13 has proved very useful, particularly in rapid quantity production. The purpose of the tool, of course is to effect momentary spreading of the opposed grooved end portions 50 of the block B sufficient for insertion of the crystal C. To this end, the body portion 68 threadedly supports an upright shaft 70 which terminates in a spheroidal upper end. A relatively large thread pitch is preferably provided so that a quarter to a half turn of the shaft 72 imparted by the handle will result in vertical displacement of approximately a thirty-second to a sixteenth of an inch. The central back portion 52 of the block B rests upon a half sleeve 80 supported atop the shaft 70 which is prevented from turning by a series of pins 74 and the opposed grooved end portions 50 of the block B each underlies a dog 76 carried at opposed side portions of the body 68. The dogs 76, as shown, are hingedly mounted on shafts 78 so as to be outwardly movable in conformance with the outward thrust of the end portions 50 when force is applied upwardly of the central back portion 52 by rotating movement of the shaft 70 whereby to spread the grooved portions 10 of the block B for reception of the crystal C.

Figs. 14 and 15 illustrate the action of the above described tool, the former when the upward force of shaft 70 distorts the block B to distend the grooved end portions 50 for insertion of the crystal C within the grooved seat 10 and the latter when the upward force is released and the block B returns to normal position retaining and housing the crystal C.

The present invention is not confined to the precise constructions and arrangements of parts herein illustrated and described but embraces such various modified forms thereof as are within the scope of the appended claims. For example, while the blocks B have been described as preferably molded of non-conducting material it is also within the concept of the present invention to construct such blocks of conducting material such as metal and employ a non-conducting material where desired, such as in the bores electrically to insulate the connector pins and as a liner to insulate the block from the outer metal cover.

Having thus set forth the nature of my invention, what I claim is:

1. Mounting means for a piezoelectric oscillator plate which comprises, a block of electrical insulating material, the said block having a rear wall, a front wall and a recess in said front wall, opposed grooved areas in said block defining opposed side wall portions of said recess, the said grooved areas being adapted to receive opposed edge portions of an oscillator plate and the said rear wall being resilient whereby to permit relative spreading of said grooved areas a distance sufficient for lateral insertion of the oscillator plate.

2. Mounting means for a piezoelectric oscillator plate which comprises, a block of electrical insulating material, the said block having a rear wall, a front wall and a recess in said front wall, opposed grooved areas in said block defining opposed side wall portions of said recess, the said grooved areas being adapted to receive opposed edge portions of an oscillator plate, the said rear wall being resilient whereby to permit relative spreading of said grooved areas a distance sufficient for lateral insertion of the oscillator plate and entrances into said recess from opposed end walls of said block for access to other opposed edge portions of the oscillator plate.

3. Mounting means for a piezoelectric oscillator plate which comprises, a block of electrical insulating material, the said block having a rear wall, a front wall and a recess in said front wall, opposed grooved areas in said block defining opposed side wall portions of said recess, the said grooved areas being adapted to receive opposed edge portions of an oscillator plate, the said rear wall being resilient whereby to permit relative spreading of said grooved areas a distance sufficient for lateral insertion of the oscillator plate, entrances into said recess from opposed end walls of said block for access to other opposed edge portions of the oscillator plate and bores in said block adjacent said entrances for reception of connecting pins.

4. Mounting means for a piezoelectric oscillator plate which comprises, a block of resilient and electrical insulating material, opposed end portions of said block defining a recess for housing an oscillator plate and having spaced grooved portions for retaining edge portions of said plate, the said grooved portions being relatively spreadable for insertion therein of said plate edge portions.

5. In combination with a piezoelectric oscillator plate, mounting means therefor which comprises, a block of electrical insulating material, the said block having a rear wall, a front wall and a recess in said front wall, opposed grooved areas in said block defining opposed side wall portions of said recess, opposed edge portions of said oscillator plate being retained in portions of said grooved areas, the confines of said grooved area portions being slightly larger than the retained edge portions of said oscillator plate so that said oscillator plate is movably mounted in said recess and the said rear wall being resilient whereby to permit relative spreading of said grooved area portions a distance sufficient for lateral insertion of said oscillator plate.

6. In combination with a piezoelectric oscillator plate, mounting means therefor which comprises a block of electrical insulating material, the said block having a rear wall, a front wall and a recess in said front wall, opposed grooved areas in said block defining opposed side wall portions of said recess, opposed edge portions of said oscillator plate being retained in portions of said grooved areas, the confines of said grooved area portions being slightly larger than the retained edge portions of said oscillator plate so that said oscillator plate is movably mounted in said recess, the said rear wall being resilient whereby to permit relative spreading of said grooved area portions a distance sufficient for lateral insertion of said oscillator plate, entrances into said recess from opposed end walls of said block for access to other opposed edge portions said oscillator plate and electrical connections for the electrodes of said oscillator plate being disposed in said entrances.

7. In combination with a piezoelectric oscillator plate, mounting means therefor which comprises a block of electrical insulating material, the said block having a rear wall, a front wall and a recess in said front wall, opposed grooved areas in said block defining opposed side wall portions of said recess, opposed edge portions of said oscillator plate being retained in portions of said grooved areas, the confines of said grooved area portions being slightly larger than the retained edge portions of said oscillator plate so that said oscillator plate is movably mounted in said recess, the said rear wall being resilient whereby to permit relative spreading of said grooved area portions a distance sufficient for lateral insertion of said oscillator plate, entrances into said recess from opposed end walls of said block for access to other opposed edge portions said oscillator plate, bores in said block adjacent said entrances and electric circuit connections for said oscillator plate including connector plugs positioned in said bores and electrical connectors to the electrodes of said oscillator plate disposed in said entrances.

8. In combination with a piezoelectric oscillator plate, mounting means therefor which comprises, a block of resilient and electrical insulating material, opposed end portions of said block defining a recess for housing said oscillator plate and having spaced grooved portions, spaced edge portions of the said oscillator plate being retained in said grooved portions and the said grooved portions being relatively spreadable for insertion or removal of said oscillator plate spaced edge portions.

9. A piezoelectric crystal device which comprises, an outer casing, an oscillator plate, means for mounting said oscillator plate within said casing, said mounting means comprising a block of electrical insulating material, the said block having a rear wall, a front wall and a recess in said front wall, opposed grooved areas in said block defining opposed side wall portions of said recess, opposed edge portions of said oscillator plate being retained in portions of said grooved areas, the confines of said grooved portions being slightly larger than the retained edge portions of said oscillator plate so that said oscillator plate is movably mounted in said recess and the said rear wall of said mounting block being resilient whereby to permit relative spreading of said grooved area portions a distance sufficient for lateral insertion of said oscillator plate.

10. A piezoelectric crystal device which comprises, an outer casing, an oscillator plate, means for mounting said oscillator plate within said casing, said mounting means comprising a block of electrical insulating material, the said block having a rear wall, a front wall and a recess in said front wall, opposed grooved areas in said block defining opposed side wall portions of said recess, opposed edge portions of said oscillator plate being retained in portions of said grooved areas, the confines of said grooved portions being slightly larger than the retained edge portions of said oscillator plate so that said oscillator plate is movably mounted in said recess, the said rear wall of said mounting block being resilient whereby to permit relative spreading of said grooved area portions a distance sufficient for lateral insertion of said oscillator plate, entrances into said recess from opposed end walls of said block for access to other opposed edge portions of said oscillator plate and electrical connections for the electrodes of said oscillator plate disposed in said entrances.

11. A piezoelectric crystal device which comprises, an outer casing, an oscillator plate, means for mounting said oscillator plate within said casing, said mounting means comprising a block of electrical insulating material, the said block having a rear wall, a front wall and a recess in said front wall, opposed grooved areas in said block defining opposed side wall portions of said recess, opposed edge portions of said oscillator plate being retained in portions of said grooved areas, the confines of said grooved portions being slightly larger than the retained edge portions of said oscillator plate so that said oscillator plate is movably mounted in said recess, the said rear wall of said mounting block being resilient whereby to permit relative spreading of said grooved area portions a distance sufficient for lateral insertion of said oscillator plate, entrances into said recess from opposed end walls of said block for access to other opposed edge portions of said oscillator plate, bores in said block adjacent said entrances, connector plugs for the device positioned in said bores and protruding exteriorly of said outer casing and electrical connections between said plugs and the electrodes of said oscillator plate disposed in said entrances.

12. A piezoelectric crystal device which comprises, an outer casing, an oscillator plate, means for mounting said oscillator plate within said casing, said mounting means comprising a block of resilient and electrical insulating material, opposed end portions of said block defining a recess and having spaced grooved portions facing said recess, spaced edge portions of said oscillator plate being seated in said grooved portions whereby to mount said oscillator plate in said recess and the said grooved portions being relatively spreadable for insertion or removal of said oscillator plate spaced edge portions.

13. Mounting means for a piezoelectric oscillator plate which comprises, a block of resilient and electrical insulating material, opposed end portions of said block defining a recess for housing an oscillator plate, means carried by said opposed end portions for receiving opposed edge portions of said plate whereby to retain said plate in said recess and the said opposed end portions being relatively spreadable for insertion of said plate in said plate edge receiving means.

14. In combination with a piezoelectric oscillator plate, mounting means therefor which comprises, a block of resilient and electrical insulating material, opposed end portions of said block defining a recess for housing said oscillator plate, means carried by said opposed end portions for receiving spaced edge portions of said oscillator plate, spaced edge portions of said oscillator plate being retained in said edge receiving means, and the said edge receiving means being relatively spreadable for insertion or removal of said oscillator plate spaced edge portions.

References Cited in the file of this patent
UNITED STATES PATENTS 2,385,666     Watrobski _____ Sept. 25, 1945
2,471,625     Johnstone _____ May 31, 1949